Dec. 17, 1963   J. W. GIFFEN   3,114,620
PNEUMATIC SHEET MOLDING APPARATUS
Original Filed Feb. 18, 1957   3 Sheets-Sheet 1
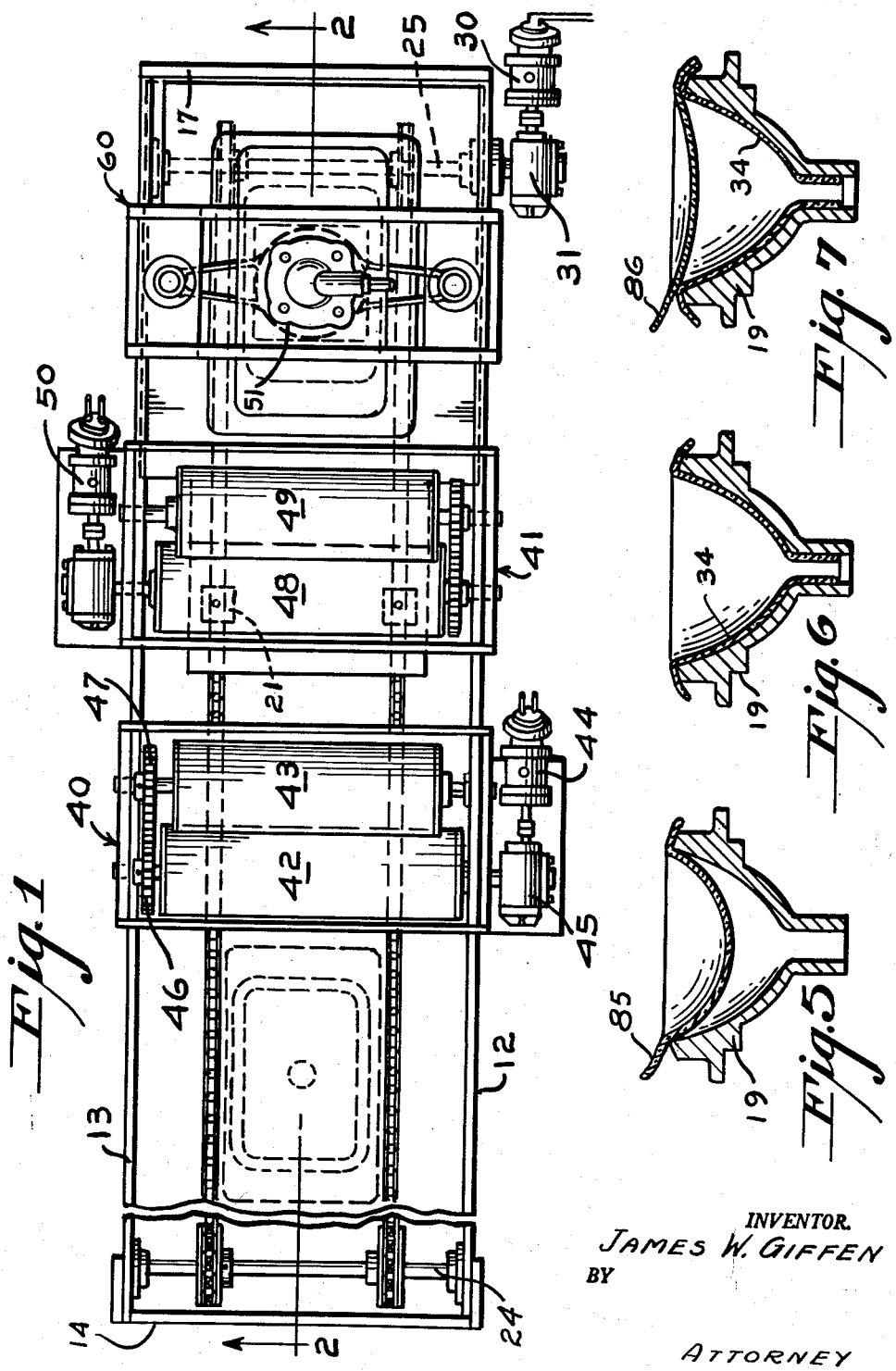
INVENTOR.
JAMES W. GIFFEN
BY
ATTORNEY Dec. 17, 1963  J. W. GIFFEN  3,114,620
PNEUMATIC SHEET MOLDING APPARATUS
Original Filed Feb. 18, 1957  3 Sheets-Sheet 2
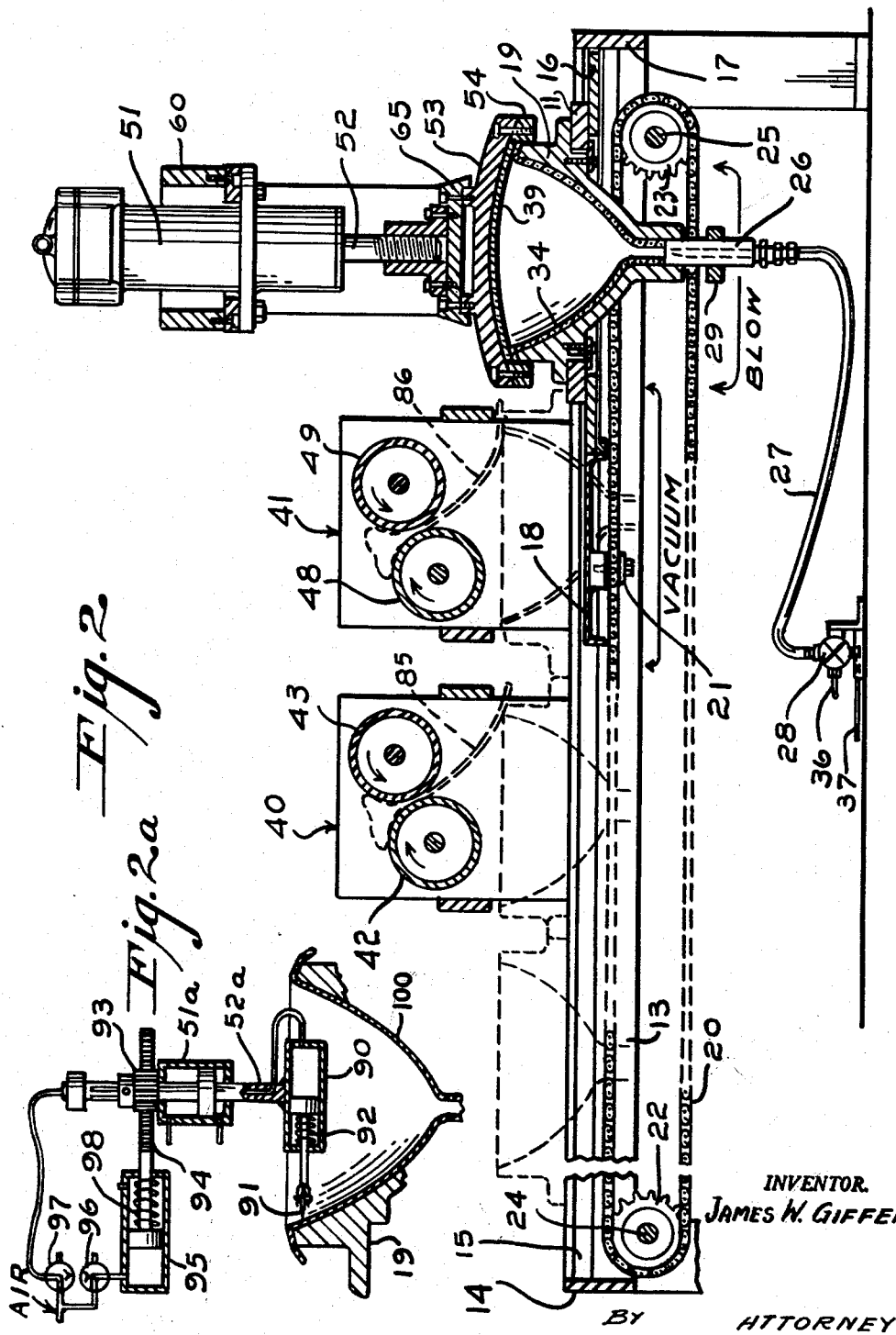
INVENTOR.
JAMES W. GIFFEN
BY
ATTORNEY

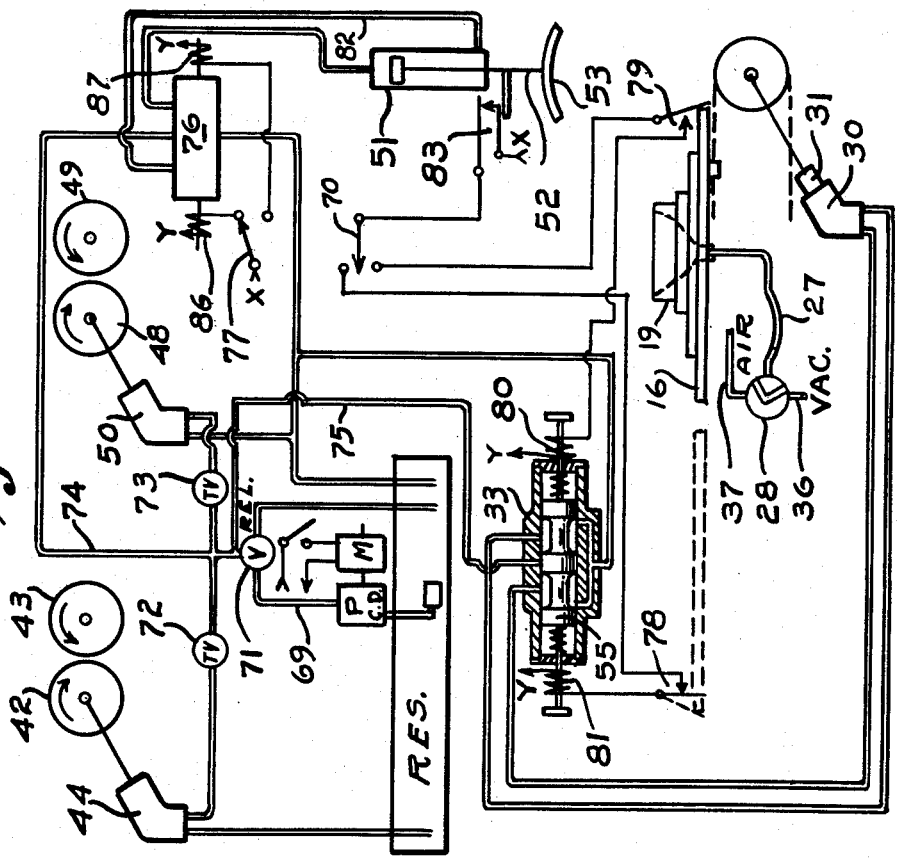
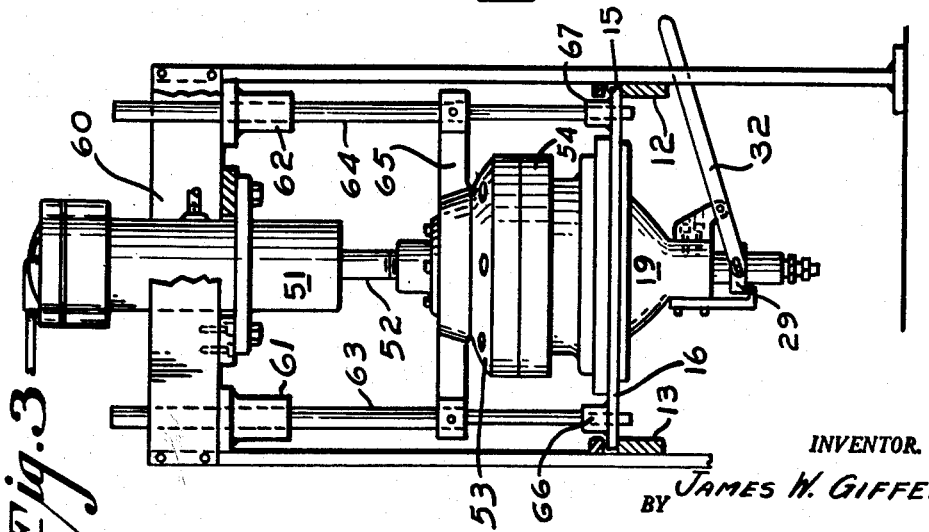

3,114,620
PNEUMATIC SHEET MOLDING APPARATUS
James W. Giffen, Corning, N.Y., assignor to Corning
 Glass Works, Corning, N.Y., a corporation of New
 York
Continuation of application Ser. No. 793,070, Feb. 13,
 1959, which is a division of 640,825, Feb. 18, 1957,
 now Patent No. 2,970,405. This application Aug. 14,
 1961, Ser. No. 131,409
8 Claims. (Cl. 65—145)

The present invention relates to a glass forming system, and is particularly concerned with the provision of an apparatus for the production of hollow glass bodies, such for example as all glass television picture tube envelopes and the like and is a continuation of application Serial No. 793,070, filed February 13, 1959, now abandoned, as a division of application Serial No. 640,825, filed February 18, 1957, and since issued as Patent No. 2,970,405.

In commercial practice such envelopes are usually made from separately formed window, panel or face plate and tubulated funnel portions that are subsequently united to one another to make complete envelopes. The panels of such envelopes are customarily pressed because of the requirement that they be of substantially uniform wall thickness, and are subsequently ground and/or polished to give them an optical quality comparable to the sheet glass panels employed in metal funnel picture tube envelopes. The funnel portions of the all-glass envelopes in the larger sizes are customarily formed centrifugally upon extremely expensive machines, and in the smaller sizes are either so formed or pressed. As is well known the forming of rectangular funnels centrifugally places definite shape limitations thereon. In both the manufacture of all glass and metal funnel picture tube envelopes however, a substantial cost of their manufacture is that of sealing the face plate to the funnel.

According to the present invention, which is a continuation of application Serial No. 793,070, filed February 13, 1959, now abandoned, as a division of application Serial No. 640,825, filed February 18, 1957, and since issued as Patent No. 2,970,405, hollow glass articles such as picture tube funnels and the like are inexpensively formed from a liquid supply body of glass delivered to such molds in sheet form. Moreover, face plates can be formed concurrently with the formation of such funnels from other molten glass in similar or different sheet form and united with the funnels by the retained heat of liquefaction of the glass of such sheets. Also, the liquid sheets employed may, if desired, be formed between rollers having plain or patterned cylindrical surfaces. The funnels of such envelopes, whether formed alone or concurrently with the formation of face plates, places no restriction on their shape which can be selected wholly with the view of that most desired, usually for maximum strength, rather than being limited to peculiar forms necessitated in the case of formation of non-circular articles by the centrifuging process.

In the formation of funnels in accordance with the present invention for use with conventionally pressed skirted panels or face plates, the molten glass spread out in sheet form is advanced over a funnel mold and sags therein by gravity alone or aided by the creation of differential pressure to form a funnel therefrom within such mold. Immediately thereafter a groover is rotated about the funnel axis in engagement with the funnel wall along a desired trim line for the purpose of severing excess glass of the sheet from the funnel.

In the formation of completed envelopes two sheets of glass in liquid form are arranged over a funnel mold in rather close succession. A vacuum line is placed in communication with the interior of the mold via its tubular portion to create negative pressure within the mold cavity to conform the initially deposited sheet to the funnel mold inner surface contour and to then puncture the outer end of the tubular wall portion of the funnel so formed. Shortly thereafter deposit of the second liquid sheet over the first is completed and by the residual heat of such sheets they become self-welded to one another where supported by the top of the funnel mold wall. Immediately following the deposit of such second sheet, positive pressure is created in the funnel cavity by connecting the tubular portion of the mold with a source of compressed air to stop the sagging of the second sheet by gravity into the cavity of the formed funnel. A mold cover, embodying a panel or face plate mold and a depending skirt or trimming die is then arranged over the funnel mold and such die forced down over the funnel mold wall to shear the excess glass of the two sheets from the envelope, the formation of which is completed by the continued application of compressed air to force the last deposited sheet to be conformed to the shape of the face plate mold contour.

For a more comprehensive understanding of the invention reference is made to the accompanying drawings in which:

FIG. 1 is a plan view of an apparatus embodying the invention suitable for use in carrying out applicant's methods.

FIG. 2 is a sectional elevation of the apparatus of FIG. 1 showing, in section, a television picture tube envelope formed thereby still occupying its forming mold.

FIG. 2a shows the mold of the apparatus in sectional elevation occupuied by a funnel formed therein and illustrates a portion of the apparatus as modified for use in grooving such funnel.

FIG. 3 is an end elevation of the apparatus with certain parts shown in section.

FIG. 4 is a wiring and piping diagram.

FIGS. 5, 6 and 7 are sectional elevations of the mold illustrating, in sectional elevation, articles in the process of formation therein.

Referring to the drawings in detail, there is shown a suitable frame provided with side members 12 and 13 and with end members 14 and 17. The side members 12 and 13 have oppositely disposed grooves such as 15 (FIGS. 2 and 3) facing one another and occupied by a mold support plate 16 slidable along the space between the frame end members 14 and 17. Attached to one edge of plate 16 is a shallow channel member 18 (FIG. 2) to which a conveyor chain 20 is attached at 21. The chain 20 is trained about sprocket wheels 22 and 23 carried on suitable transverse shafts 24 and 25 respectively. Shaft 25 is adapted to be driven by a hydraulic motor 30 (FIGS. 1 and 4) through the medium of a suitable gear reduction unit 31. As will be brought out hereinafter, the motor 30 is selectively fed fluid by a magnetically operated four-way valve 33 (FIG. 4) to slide plate 16 along the side members 12 and 13.

The mold support plate 16 has a central passage therethrough of a size suitable to accommodate an adapter bushing 11 (FIG. 2) for receipt of a funnel mold 19 or the like. The wall of mold 19 at its top end has an exterior surface which is generally perpendicular and, as will be brought out later, is usable in conjunction with a depending skirt 54 of a cover 53 for such mold and cooperates with the mold wall as a trimming die to shear excess glass from sheets thereof such as 85 and 86 previously deposited over the upper end of the mold.

The mold 19 has a tubular bottom the bore of which is in part occupied by a knockout valve 26 having a passage therethrough in communication with a flexible conduit 27 extending to a valve 28 by means of which a vacuum line 36 can be placed in communication with the mold 19 to form a funnel such as 34 and perforate its tubulated end, and by means of which a compressed air line 37 can be placed in communication with such funnel to shape a panel such as 39 to the contour of cover 53. The knockout valve or element 26 is coupled by means of a collar 29 to a manually operable knockout lever 32.

Arranged over a central region of the frame side members 12 or 13, and suitably spaced from one another, are similar glass sheet forming assemblies 40 and 41. The assembly 40, for example, embodies rollers 42 and 43 spaced a distance from one another determined by the thickness of glass sheet to be rolled. Roller 42 is adapted to be driven by a hydraulic motor 44 through the medium of a gear reduction unit 45. Roller 43 is driven from the shaft of roller 42 by means of gears 46 and 47. The rollers 48 and 49 of the assembly 41 are similarly driven by a hydraulic motor 50. For the sake of simplicity the rollers 42, 43, 48 and 49 have been shown as having plain cylindrical surfaces.

Arranged in bridge of the frame side members 12 and 13 in the space between the sheet forming assembly 41 and the frame end member 17, is a crosshead assembly 60 provided with a hydraulic cylinder unit 51 having a depending piston rod 52 to which is attached the mold top cover 53. The vertical movement of cover 53 by the hydraulic unit 51 is under the control of a magnetically operated four-way valve 76 (FIG. 4) similar to the valve 33.

Depending from the end regions of crosshead 60 are bearings 61 and 62 in which are slidably arranged vertical guide rods 63 and 64 which are bridged by a mold cover crossmember 65 having its ends fixed with respect to the guide rods 63 and 64. The lower ends of rods 63 and 64 are adapted to enter sleeves 66 and 67 respectively secured to the mold plate 16 in register with passages therethrough to assure perfect alignment of the mold 19 and cover 53 as the cover skirt 54 is brought into shearing relation with top outer bordering edge of the wall of mold 19.

In FIG. 4 a conventional hydraulic fluid supply system is shown as comprising a motor M, for driving an associated fluid pump P, and a fluid reservoir RES. The output conduit 69 of pump P delivers hydraulic fluid through a pressure release valve 71 and suitable motor activators comprising manual control valves 72 and 73 to the respective roller drive hydraulic motors 44 and 50. Other branch fluid feed lines 74 and 75 extend respectively to the magnetically controlled four-way valves 76 and 33. The operations of valve 76 are under the direct control of an activator comprising a manually operable switch 77. The operations of valve 33 are under the joint control of an activator comprising a manually operable switch 70 and mold support plate operated switches 78 and 79 respectively. A switch 83 associated with the mold cover operating piston rod 52 is included in a common branch of the operating circuits for the magnets 80 and 81 of valve 33 to prevent its possible operation and the resultant feeding of operating fluid to motor 30 while cover 53 is arranged on the mold, and at which time the plate 16 is locked against movement.

To employ the apparatus in the manufacture of funnels only, the cover operating assembly may be replaced with any suitable form of groover assembly. In the showing of FIG. 2a a hydraulic cylinder 51a is shown for replacing cylinder 51. The tubular piston rod 52a at its lower end carries a pneumatic unit 90 whose piston rod is provided with a grooving wheel 91 normally held in a retracted position by a spring 92. A pinion 93 is splined to rod 51a and is adapted for rotation to effect a grooving operation by a rack 94 driven by a pneumatic unit 95 when a valve 96 is opened. A valve 97 is provided for feeding air to cylinder 90 to engage wheel 91 with the funnel wall after the rod 52a has lowered it into the funnel.

Operation

In the operation of the system the rollers 42, 43, 48 and 49, the mold 19, its cover 53 and skirt 54 are initially suitably preheated to prevent them from objectionably chilling molten glass engaged by them. Such preheating may be effected in any convenient manner, as for example by use of suitable combustion flames.

The mold 19 as shown has in it a complete picture tube envelope, comprising a funnel portion 34 and a panel portion 39. To unload the mold 19 an attendant moves switch 77 into engagement with its upper contact as shown, thus energizing magnet 86 of valve 76 to shift its spool (not shown) to the right to enable such valve to feed operating fluid via conduit 82 to the lower end of unit 51, to raise the cover 53 and its skirt 54 clear of the formed envelope.

The attendant next moves switch 70 into engagement with its upper contact to establish a circuit for magnet 81 of valve 33, thus causing it to move its spool 55 to the right, in which position it feeds operating fluid to motor 30 in the proper direction to advance plate 16 leftward. As plate 16 arrives adjacent frame end member 14 it opens switch 78 thus interrupting the circuit of magnet 81 to permit the spool of valve 33 to restore to its fluid feed blocking position, as shown.

Removal of the envelope from mold 19 is effected by operation of the lever 32 to, through the medium of valve 26, elevate the envelope in the mold 19 and from which it may then be lifted in any desired manner. To initiate the formation of another envelope valves 72 and 73 are opened to feed operating fluid to the roller drive motors 44 and 50 respectively, unless they have been permitted to continuously rotate from a preceding operation, and a gather of glass deposited in the bight of rollers 42 and 43. At substantially the same time switch 70 is engaged with its lower contact to complete an energizing circuit for magnet 80 of valve 33, via switch 79, causing the spool of such valve to shift to the left to feed operating fluid to motor 30 in the proper direction to return plate 16 to the position in which it is shown. By suitable timing of the advance of a sheet such as 85 (FIG. 2) of molten glass issuing from between rollers 42 and 43 and of the advance of plate 16 to the right, the sheet, in the fashion illustrated in FIGS. 2 and 5, becomes deposited over the mold cavity and begins to sag thereinto. The valve 28 (FIGS. 2 and 4) is then operated in a manner to connect the vacuum line 36 to the mold 19 at its neck end, thus aiding gravity in forming the sheet into a funnel such as 34 and finally effecting a rupture of the outer tubular end of the funnel so formed as indicated. A second gather of glass is next deposited in the bight of rollers 48 and 49 and an issuing sheet of molten glass, such as 86, deposited over the formed funnel 34 as the plate 16 continues its rightward advance. Before completion of the deposit of the sheet 86 valve 28 is closed, but as soon as deposit of sheet 86 has been completed the valve 28 is operated in a manner to supply sufficient air from a line 37 to the interior of the funnel to stop sagging of the sheet thereinto. Upon the arrival of the plate 16 at the right end of the assembly the operating circuit of magnet 80 is interrupted by switch 79 thereby permitting the spool 55 of valve 33 to restore to its initial position to discontinue the supply of fluid to motor 30. Switch 77 is then engaged with its lower contact to energize magnet 87 and thus effect the operation of valve 76 in a manner to feed fluid to the upper end of unit 51 to lower the cover 53 down over mold 19 causing the skirt 54 to shear the excess glass away from that within and over the mold. The valve 28 is now further opened to quickly supply sufficient air to the funnel to conform the panel such as 39 to the contour of the mold cover 53. In the foregoing operation the panel and funnel are sealed to one another along their line of juncture from the residual heat of the respective molten glass sheets from which they have been formed.

To effect removal of the completed envelope from the mold, after first closing valve 28, switch 77 is returned into engagement with its upper contact to cause valve 76 to feed fluid to the lower end of unit 51 to raise mold cover 53 to its initial position. The switch 70 is then operated into engagement with its upper contact to again effect energization of the magnet 81 of valve 33 to restore plate 16 to its leftward position. With plate 16 at its leftward position, lever 32 may be operated to elevate the completed envelope in the mold by means of its associated valve 26, as already described.

If the apparatus is to be employed to form funnels only, a funnel 100 (FIG. 2a), similar to funnel 34, is formed in the manner already described except that the negative pressure created within mold 19 may be restricted to that necessary to tubulate the funnel. When funnel 100 arrives at the position in which funnel 34 is shown in FIG. 2 the unit 51a (FIG. 2a) is operated to lower cylinder 90 into the funnel; valve 97 is operated to advance wheel 91 into engagement with the funnel wall; and valve 96 is operated to effect the grooving operation. Valve 97 is then closed to permit spring 92 to retract the wheel 91 from engagement with the funnel wall, and unit 51a is operated to withdraw the cylinder 90 from the funnel. Valve 96 is subsequently opened to permit the spring 98 of unit 95 to restore its piston to its leftward position in preparation for a subsequent grooving operation. Actual severance along the trim line is subsequently effected in any desired manner, but preferably by thermal crack-off as described in Patent No. 2,629,206.

Although the particular form of envelope shown has a convex exterior face, the invention also contemplates the formation of articles having concave exterior surfaces. For example, by leaving the valve 28 closed after formation of a funnel, or by opening it to atmosphere at such time, the sagging of the second deposited sheet can be variably controlled to form an envelope with a face having a desired concave exterior surface. Alternatively, if greater concavity is desired the valve may be operated to connect the interior of an envelope to the vacuum line.

Alternatively, instead of employing a hollow mold such as shown, such a mold may be replaced with a mold having a positive surface as for example in the shape of an inverted pie or baking disc over whose surface an applied sheet of molten glass would sag by gravity and from the border of which the excess glass of the sheet would be sheared by a suitable skirt or trimming die.

Moreover, although the invention has been illustrated as embodying an apparatus for forming lengths of sheet glass of uniform thickness and only of sufficient length to form the respective parts of a glass envelope, and facilities have been shown only for intermittently forming envelopes, its concept includes their production from ribbons or sheets of molten glass of uniform or suitably varied thickness or surface configurations continuously issuing from a molten supply body thereof, and which are fed to a series of concave or convex article forming mold surfaces successively made available to the issuing molten glass ribbons.

What is claimed is:

1. A glass working apparatus which embodies a hollow mold comprising a wall at the top bordering a relatively large cross sectional entrance into its cavity and at the bottom borders a relatively small cross sectional entrance to its cavity, means for moving said mold between alternative positions, a top cover for the mold arranged over one of such positions having a depending skirt slidable down over the top of such wall as a shear when the mold is at such one of its positions, two molten sheet glass supply means positioned over and along the path of travel of said mold for the successive arrangement of two sheets of molten glass over said mold during its travel to such one of its positions, a single valve connected to negative and positive fluid pressure lines and the bottom entrance of the mold cavity respectively, means for effecting relative movement between said cover and mold to bring them into shearing relation, and control means to activate in succession the means for moving the mold, the glass supply means and the means for effecting relative movement between the cover and the mold respectively, said valve being operable in the interval between the arrangement of such sheets of molten glass over the mold and after the relative movement between the cover and the mold respectively to successively connect said lines to the bottom mold cavity entrance to form an article within the mold from such sheets.

2. A glass working apparatus as in claim 1 wherein said valve is operable to connect the interior of the mold with the negative pressure line to conform the first sheet to be arranged over the mold to the mold cavity and its small cross section entrance bordering surfaces, and operable to connect the interior of the formed sheet via such entrance with the positive pressure line to conform the second sheet to the top contour of such mold cover.

3. A glass forming apparatus which includes, a hollow mold having top and bottom entrances to its cavity, means embodied in such apparatus for moving said mold from an initial to an alternative position along a linear path and for restoring the mold to its initial position, an activator for said means, two means for successive formation and arrangement of two sheets of molten glass over the top of said mold during its travel along such path, control means for activating said two means in succession, a single valve connected to negative and positive fluid pressure supply lines and the bottom entrance of the mold cavity respectively, said valve being operable to connect the negative pressure supply line with the bottom entrance of such cavity after arrangement of one sheet over the mold to create negative pressure within the mold to conform part of the sheet to the contour of the mold cavity and its bottom entrance boundary, said valve being operable to connect one of such supply lines to the interior of the article via the bottom entrance of the mold cavity following arrangement of a second sheet of molten glass over the mold to impart to it a desired contour.

4. A glass forming apparatus which includes, an elongated frame, a mold support horizontally movable along the length of said frame, a hollow mold arranged on said support having an open top end and a bottom end having a passage therethrough, means for moving said support along said frame to convey said mold between two positions, an activator for said means, two glass supply means arranged lengthwise along such path of travel each for depositing a sheet of molten glass over said mold during its travel along said frame, a single valve connected to negative and positive fluid pressure supply lines and the bottom end passage of said mold respectively, said valve being operable to connect the negative pressure supply line with the mold passage to create a negative pressure within the mold to conform part of a first deposited sheet to the cavity and bottom passage boundary surfaces of said mold, a top end cover available to the mold while at the position attained with sheets of glass thereover, means for lowering said cover over said mold, and activating means therefor operative while the mold is at such latter position, said valve means being operable after the lowering of the cover over said mold to connect the positive pressure supply line with the interior of the cavity of the first deposited sheet via the bottom passage of the mold to conform part of the second deposited sheet to the contour of the under surface of said cover.

5. A glass working apparatus which includes a hollow mold having a wall at the top bordering a relatively large cross sectional entrance to its cavity and at the bottom bordering a relatively small cross sectional entrance to its cavity, means for moving said mold along a horizontal path to an alternative position, means along the mold path for arranging a sheet of molten glass over the top of said mold as it is being conveyed along such path, a valve connected to the bottom entrance of the mold cavity and to negative and positive pressure air supply lines, respectively, said valve being operable to connect the bottom entrance with the negative pressure air supply line to conform such molten sheet in part to the contour of the interior surface of the mold and of the border about its bottom entrance, means further along such path for arranging a second sheet of molten glass over the first sheet as the movement of the mold continues along its path, and means for activating said respective means in the sequence indicated, said valve being operable to connect the mold bottom entrance with the positive pressure air supply line to form such second sheet.

6. An apparatus as in claim 5, which includes a cover for the mold at its alternative position, means for arranging said cover over the mold, and a device for activating said means prior to the connection of such mold bottom entrance with the positive pressure air supply line to restrict the form of such second sheet to the contour of said cover.

7. An apparatus as in claim 6 wherein the cover has a surrounding skirt cooperative with the outer border of the mold as a shear to separate portions of the sheets from other portions thereof during placement of the cover over the mold.

8. A glass working apparatus which includes, a hollow glass mold having passages into the interior thereof at its top and bottom respectively, means for moving said mold from an initial to an alternative position, apparatus for activating said means, means arranged over the path of travel of the mold for forming a molten sheet of glass from a parent supply body thereof and for issuing such sheet into the path of travel of the top of the mold to deposit such sheet over the top passage thereof as the mold travels thereunder toward such alternative position, means for activating said last means while the mold travels thereunder, means arranged over the path of travel of the mold for forming and issuing a second sheet of molten glass into the path of travel of the top of the mold to deposit such sheet over that previously deposited thereover during the continued travel of the mold toward such alternative position, means for activating said last means while the mold travels thereunder, a mold cover element arranged over such alternative position vertically movable down over the mold when at such position and having a bordering skirt slidable over an outer margin of the top end of the mold as a shear, means for downwardly moving said cover, means for effecting such movement when the mold is in its alternative position, a single valve to which negative and positive fluid pressure supply lines are connected, a conduit extending between such valve and the exterior end of such bottom passage whereby said valve is operable to connect the negative pressure supply line to the mold cavity through such passage to conform the first deposited sheet to the contour of the inner surface of the mold and to the border of its bottom passage, said valve being thereafter operable to connect one of said fluid supply lines to the bottom passage of the mold to form such second sheet.

References Cited in the file of this patent

UNITED STATES PATENTS

| | | |
|---|---|---|
| 1,513,756 | Hancock | Nov. 4, 1924 |
| 1,934,798 | Gelstharp | Nov. 14, 1933 |
| 1,984,924 | Fox | Dec. 18, 1934 |
| 1,984,942 | Owen | Dec. 18, 1934 |
| 2,179,317 | Barnard | Nov. 7, 1939 |
| 2,333,076 | Stewart | Oct. 26, 1943 |
| 2,410,345 | Hinkley | Oct. 29, 1946 |
| 2,518,690 | Holman et al. | Aug. 15, 1950 |
| 2,665,524 | Brown | Jan. 12, 1954 |
| 2,699,014 | Van Steenis | Jan. 11, 1955 |
| 2,807,121 | Hamilton | Sept. 24, 1957 |